United States Patent Office 3,564,058
Patented Feb. 16, 1971

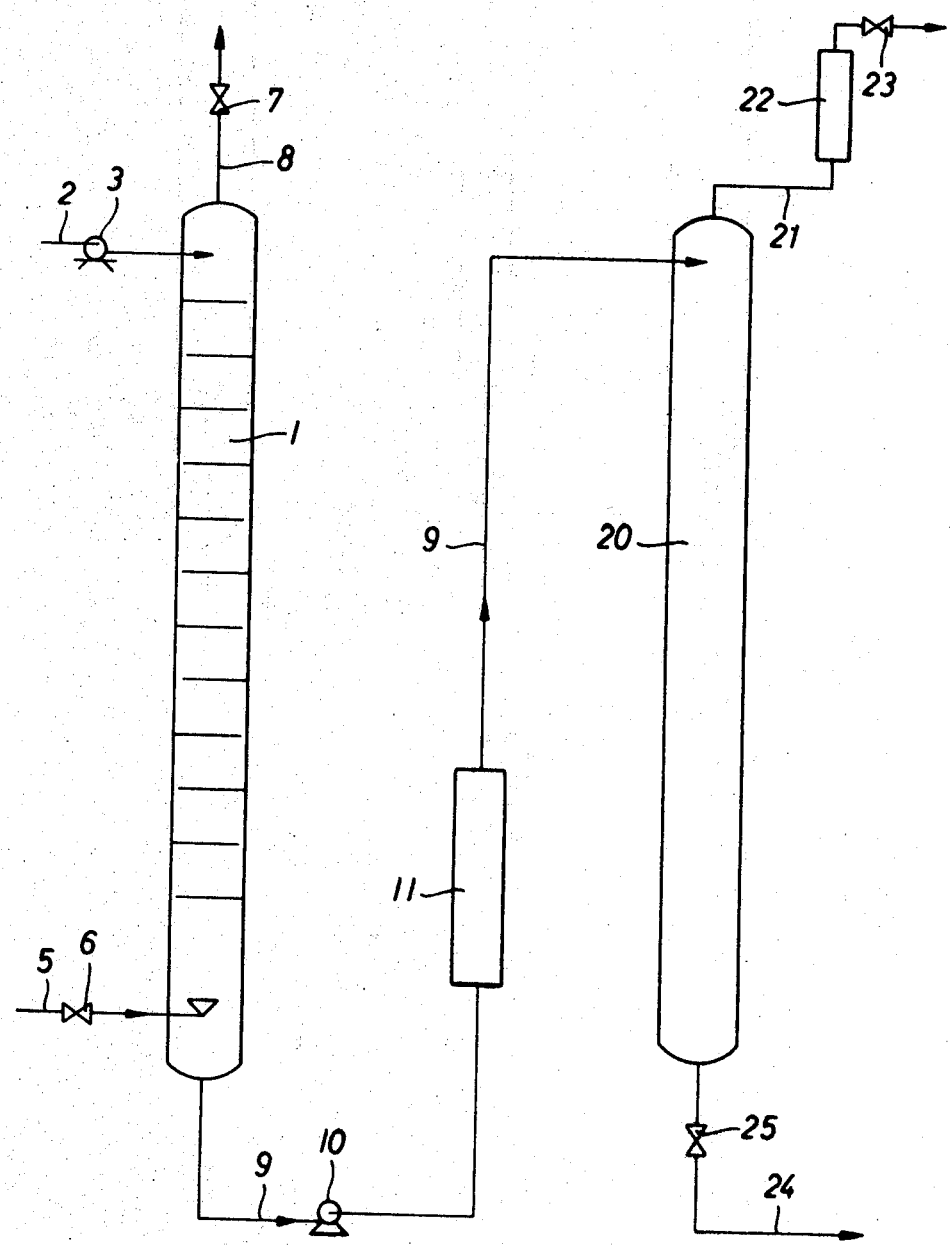

3,564,058
PROCESS FOR THE MANUFACTURE OF CYCLO-
HEXANOL AND CYCLOHEXANONE
Roland Lang, Anspach, Taunus, and Horst Corsepius,
Frankfurt am Main, Germany, assignors to Vickers-
Zimmer Aktiengesellschaft Planung ung Bau van In-
dustrieanlagen, Frankfurt am Main, Germany
Filed Dec. 7, 1967, Ser. No. 688,774
Claims priority, application Germany, Dec. 7, 1966,
V 32,498
Int. Cl. C07c 35/08, 45/08, 49/30
U.S. Cl. 260—586                                    5 Claims

ABSTRACT OF THE DISCLOSURE

This invention relates to the process for the manufacture of cyclohexanol and cyclohexanone by the oxidation of cyclohexane which comprises contacting an oxygen-containing gas with cyclohexane in a first reaction vessel to obtain oxygen-saturated cyclohexane and transferring the oxygen-saturated cyclohexane to a second reaction vessel maintained at a higher temperature for the oxidation reaction.

BACKGROUND OF THE INVENTION

Field of the invention—description of the prior art

This invention related to a process for producing cyclohexanol and cyclohexanone.

Cycloaliphatic alcohols and ketones can be prepared by oxidizing cycloaliphatic hydrocarbons of corresponding structure with oxygen or with oxygen-containing gas mixtures. In many cases, the reaction mixtures are admixed with oxidation catalysts or optionally also with substances which shorten the induction period of the oxidation. Large quantities of cyclohexanol and cyclohexanone are produced from cyclohexane by these processes, for use as solvents for oils, fats, waxes, resins, nitro- and acetyl-cellulose, rubber and other substances.

The conventional oxidation of cyclohexane is carried out in the liquid phase as a heterogenous process. To this end, the cyclohexane is introduced into a reaction vessel, which may be provided with packings, plates or a stirrer mechanism and oxygen or an oxygen-bearing gas mixture, for example air, is pumped into this reaction vessel from below with such a velocity, that the liquid phase is maintained in a continuous and vigorous foaming movement. In many cases, additional quantities of oxygen or oxygen-bearing gas are introduced at different levels into the reaction vessel. It has been proposed to introduce the oxygen or the oxygen-bearing gas mixture into the reaction vessel through the shaft of the stirrer unit. In this manner, heterogenous reaction system is formed in the reaction vessel, with one component in liquid and the other in gaseous form. The oxidation products are withdrawn from the reaction vessel. In other to improve the yield, this process can be repeatedly carried out in several reaction vessels, connected serially in a cascade arrangement.

Owing to the heterogenous nature of the reaction system, a considerable excess of oxygen is available at all times within the reaction vessels. Although the presence of the excess of oxygen intensifies and accelerates the formation of cyclohexanol and cyclohexanone from the cyclohexane, it also promotes and accelerates in an equal measure the undesirable oxidation of the already formed cyclohexanol or cyclohexanone to oxygen-richer products, for example acids, or to oxidative degradation products, with consequent reduction of the yield.

Thus, in the process proposed in German patent specification No. 859,465, for a conversion of 17% of the cyclohexane employed, the yield of cyclohexanol and cyclohexanone amounts to only about 63% of theory, calculated on the conversion. In this process, the cyclohexane is reacted with air under elevated pressure and at a temperature of from 120 to 135° C., in the presence of an oxygen-transfer agent. The oxygen-transfer agent may be manganese, cobalt, copper or vanadium, or an oxide or salt of one of these metals, as well as aldehydes, ketones, ethers or other peroxide-forming substances, such as tetrahydronaphthalene or tetrahydrofuran. However, in this process over 35% of the reacted cyclohexane is converted into undesirable by-products or cleavage products by the further oxidation of the already formed cyclohexanol or cyclohexanone. As examples of such by-products or cleavage products there may be mentioned caproic acid, valeric acid, butyric acid, acetic acid, forming acid, adipic acid, succinic acid, glutaric acid, oxalic acid, carbon dioxide and carbon monoxide, butyro- and valero-lactone, keto-alcohols, keto-acids, esters and some thus far undefined condensation products.

In other to prevent the formation of esters, it has been proposed in German patent specification No. 878,350 to effect the oxidation of cyclohexane with oxygen or an oxygen-containing gas mixture at a temperature above 100° C., preferably between 155 and 160° C., and under a pressure of from 20 to 35 atmospheres, in the presence of an alkali metal hydroxide solution. Again, oxidation-promoting substances may be added to the reaction mixture. For a conversion of about 12% of the cyclohexane employed, a yield of cyclohexanol and cyclohexanone of about 70% is achieved, calculated on the conversion, while 30% of the reacted cyclohexane is converted to undesirable by-products and cleavage products. When carrying out this process continuously on an industrial scale, it is further found that in temperature ranges in which the best yields of cyclohexanol and cyclohexanone are obtained in the absence of alkali metal hydroxide solutions, the oxidation proves difficult if not impossible to initiate in the presence of alkali metal hydroxide solutions.

The same unfavorable effect is produced by water, the addition of which is recommended in U.S. Pat. No. 2,565,-087 in amounts of from 10 to 30% by weight, calculated on the cyclohexane employed. In this process, the conversion of the reacted cyclohexane into undesirable by-products and cleavage products still amounts to over 20%.

Nor could the proportions of these undesirable by-products and cleavage products be reduced by the measures disclosed in German patent specification No. 1,009,-625. According to the latter, the oxidation mixture is to be repeatedly extracted with water during and after completion of the oxidation, whilst the water formed by the oxidation is continuously removed from the reaction mixture. Although in this technically rather complicated manner it is possible to remove carboxylic acids from the reaction mixture to prevent them from forming esters with the cyclohexanol formed, the amount of the esters formed during the oxidation which cannot be extracted with water nevertheless remains considerable in the reaction products, since the acids removed from the reaction mixture are resynthesized in corresponding quantities by the chemical equilibrium requirements in the course of the next treatment of the reaction mixture with oxygen or air.

For this reason, the U.S. Pat. No. 2,557,281 recommends the continuous distillative removal of the water formed during oxidation and, in order to facilitate the separation of the isolated oxidation products, to extract the acids with water from the latter. However, even with this process, over 20% of the reacted cyclohexane is transformed into undesirable by-products and cleavage products.

In German patent specification No. 1,046,610 and German patent specification No. 1,175,121, it is further proposed to wash the oxidation mixtures with water not only during the oxidation and at the end of it, but to treat them at least once with an aqueous alkali hydroxide solution, optionally at elevated temperature. However, these measures serve only to facilitate the separation of the acids and esters from the cyclohexanol-cyclohexanone mixture. According to German patent specification No. 1,047,778, the formation of high-molecular weight products during the oxidation, which settle out on the walls of the reaction vessel and on the catalyst and thus hinder the conversion process, may be prevented by treating the cyclohexane prior to oxidation with an aqueous solution of acid substances and separating it therefrom. However, an increase of cyclohexane conversion or of the cyclohexanol/cyclohexanone yield is not achieved with the two last-mentioned processes.

The same applies to the process proposed in German patent specification No. 1,090,659, according to which the oxygen-containing gas is to be passed through the oxidation mixture in bubbles of more than 6 mm. in diameter. The grading of the gas-bubble sizes towards higher diameters is supposed to promote the formation of cyclohexanol and cyclohexanone, whilst gas bubbles of smaller diameter promote the formation of higher oxidation products. Nevertheless, for a cyclohexane conversion of only 6%, the cyclohexanol-cyclohexanone yield calculated on this conversion amounts to only 75%.

According to the disclosure of German patent specification Nos. 1,090,569 and 1,100,020, the same effect is to be achieved by reducing the partial pressure of oxygen in the reaction mixture, by admixing it with the triple or quadruple volumes of inert gases.

In order to shorten the induction period of the initiation of the liquid-phase oxidation of cyclohexane, German patent specification No. 1,120,445 recommends the addition to the cyclohexane of between 1 and 30% by weight of a drying agent, for example phosphorus pentoxide, an anhydride of an organic acid or similar substances.

According to German patent specification No. 1,150,674, mitigation of the excessive oxidation of cyclohexane can be achieved by carrying out the oxidation in several stages, wherein the first stage the throughput of oxygen is restricted to between 25 and 75%. In spite of this measure, the yield of cyclohexanol and cyclohexanone is only about 72%, for a cyclohexanone conversion of about 8%.

Thus, in these previously proposed processes, the value of the cyclohexane-conversion is between 5 and 8%, while the corresponding yield of cyclohexanone and cyclohexanol amounts to 70 to 75%. If the conversion rate is increased beyond 8% of the cyclohexane employed, the cyclohexanol-cyclohexanone yield falls sharply, and considerably greater quantities of undesirable by-products and cleavage products are formed. Only the use of boric acid as catalyst allows a further slight increase in the yield of cyclohexanol and cyclohexanone. However, the technical expenditure involved in the recovery of boric acid is extremely high.

In view of the foregoing, means were sought which would make it possible to increase both the cyclohexane conversion and the related cyclohexanol-cyclohexanone yield in oxidation of cyclohexane, with the aid of simple technical measures.

THE INVENTION

According to the present invention, there is provided a process for producing cyclohexanol and cyclohexanone, wherein cyclohexane is subjected to continuous partial oxidation with oxygen or an oxygen-containing gas mixture in the liquid phase under elevated pressure and at an elevated temperature, optionally in the presence of a catalyst and/or oxidation-promoting substance, and wherein oxygen is first dissolved in the cyclohexanone under elevated pressure until saturation in a first absorption vessel, and this solution is then reacted in a second reaction vessel while maintaining or further increasing the pressure and the temperature, the reaction products being recovered by subsequent distillative separation.

The present process may be carried out by introducing the cyclohexane into a first absorption vessel, which is conveniently an absorption column provided with plates or packings, although a stirrer column provided with a gas-distributor device extending through the shaft of the stirrer mechanism may also be used. A finely divided stream of oxygen or of a gas mixture such as air, which contains only inert gases in addition to the oxygen is fed into the cyclohexane contained in the absorption vessel until the saturation point is reached. The oxygen or the oxygen-bearing gas mixture is advantageously dissolved in the cyclohexane under a pressure of from 30 to 200 kg./cm.$^2$. It may also be advantageous to maintain a temperature of from 30 to 120° C. during the absorption of the oxygen in the cyclohexane. This temperature, which is maintained during the absorption of the oxygen in the cyclohexane, should be advantageously 20 to 100° C. below the temperature which will be maintained in the reaction vessel during the subsequent oxidation. Similarly, the pressure under which the oxygen or oxygen-containing gas mixture is dissolved in the cyclohexane should preferably be lower by 10 to 30 kg./cm.$^2$ than the pressure maintained in the reaction vessel during oxidation.

The absorption vessel containing the cyclohexane can be fed either with oxygen alone or with an oxygen-containing gas mixture, for example air. Where pure oxygen or a gas mixture containing more than 22% oxygen is used, the addition of catalysts or of other oxidation-promoting substances to the solution of oxygen in the cyclohexane can be dispensed with. When using a gas mixture with a lower oxygen content, it is advantageous to add to the oxygen-cyclohexane solution an oxidation catalyst, for example, cobalt, nickel, iron, lead, copper, vanadium, titanium, bromine, molybdenum, uranium, manganese, platinum, silver, tin, calcium, magnesium or oxides or salts of these elements. Of these catalysts, cobalt naphthenate being particularly effective. A keytone, aldehyde or ether, tetrahydronaphthalene, tetrahydrofuran or an organic peroxide may be added as an oxidation-accelerating substance to the oxygen-containing cyclohexane solution. The substantial prolongation of the induction period which occurs in most cases at lower concentrations of dissolved oxygen can be shortened in the present process by the addition of a drying agent, for example phosphorus pentoxide, silica, anhydrous sodium or copper sulphate, or a carboxylic acid anhydride. These drying agents can be added to this solution together with oxidation catalysts and/or the oxidation-accelerating substances. The catalysts, the oxidation-accelerating substances and the drying agents can also be mixed into the cyclohexane prior to the dissolution of oxygen. The most favorable quantities of catalysts, oxidation-accelerators and drying agents to be added depend on the particular agents employed and can be easily determined.

The oxygen-containing cyclohexane solution prepared in this manner is then continuously transferred into a second reaction vessel and is partly converted therein at a temperature of from 150 to 250° C. and under a pressure of from 30 to 200 kg./cm.$^2$.

The reaction mixture withdrawn from this second reaction vessel after oxidation has been completed is subjected to pressure reduction and washed with water. After separation of the aqueous phase from the organic phase, the two phases are processed by distillation. A small amount of unreacted cyclohexane can be isolated from the aqueous phase, and is then returned to the process, as is cyclohexane distilled from the organic phase. The cyclohexanol-cyclohexanone mixture remaining as distillation residue from the organic phase is then subjected to distillative separation and purification.

In order to enable the invention to be more readily understood, reference will now be made to the accompanying drawing, which illustrates diagrammatically the apparatus in which the process according to the invention can be carried out.

The apparatus shown in the drawing consists of an absorption column 1, into which cyclohexane is fed through a conduit 2, this feed being regulated by the proportioning device or pump 3, while oxygen or an oxygen-containing gas mixture is introduced through a conduit 5 and a valve 6. Excess quantities of gas can be eliminated from the absorption column 1 through a relief valve 7 and a conduit 8. The oxygen-containing cyclohexane solution is pumped from the sump of the absorption column 1 to the head of a reaction vessel 20 by means of a pump 10 via a conduit 9 and a preheater 11. For dissipating the heat of reaction, the reaction vessel 20 may be either surrounded with a cooling jacket or provided with a cooler arranged in the reaction chamber (both not shown). If necessary, a device for effecting the proportioned addition of catalysts and similar substances may be provided at the top of the reaction vessel. The waste gases issuing from the reaction mixture leave the reaction vessel 200 through a conduit 21 leading to a reflux condenser 22, in which the entrained cyclohexane is recovered and returned to the process. The non-condensable gases leaves the reflux condenser 22 through a valve 23. The reaction products dissolved or suspended in cyclohexane are removed from the reaction vessel 20 for further processing through a conduit 24 and a valve 25.

When the apparatus just described is in continuous operation, about 16% of the cyclohexane employed is converted into cyclohexanol and cyclohexanone with a yield of over 80%. This advantageous conversion rate and the associated high yield are surprising, especially since during the heating of the oxygen-containing cyclohexane solution to the temperature of from 150 to 250° C., required to bring about the onset of the oxidation, a large release of oxygen from the solution is to be expected, in accordance with the Henry's Law. Contrary to expectations, it has now been found that the Bunsen absorption coefficient α increases with rising temperature in the case of oxygen-containing cyclohexane solution under the condtions of the present invention so that the expected degassing of the oxygen-containing cyclohexane solution does not take place. The present process thus makes possible the oxidation of cyclohexane to cyclohexanol and cyclohexanone with high yields in a technically simple manner.

The invention will now be further illustrated by the following example which was carried out in an apparatus as shown in the drawing:

21.45 parts by weight of cyclohexane, preheated to 80° C., were fed continuously in the course of 11 hours into an absorption column provided with sieve plates. At the same time, an excess quantity of oxygen was introduced continuously into the absorption column, the contents of which were kept under pressure of 140 kg./cm.$^2$.

To the solution of oxygen in cyclohexane there were added 2.5 p.p.m. cobalt naphthenate (calculated on the quantity of cyclohexane). This solution was then continuously pumped through a second reaction vessel, the contents of which were maintained at a temperature of 162° C. and under a pressure of 150 kg./cm.$^2$. The residence time of the solution in the second reaction vessel was about 12 minutes. The effluent gases leaving this reaction vessel were cooled to −70° C., and 0.65 part by weight of cyclohexane separated out and were returned to the process.

The reaction mixture drawn continuously from the reaction vessel was first washed with about 1.0 part by weight water, and the aqueous phase was separated from the organic phase. A total of 17.5 parts by weight unreacted cyclohexane were recovered from the aqueous phase and the organic phase by distillation and returned to the process.

Thus, the conversion calculated on the base of cyclohexane employed was 15.4%, 2.90 parts by weight of cyclohexanol and 1.03 parts by weight of cyclohexanone were isolated by distillation from the distillation residue. These quantities correspond to a conversion-related yield of 85.5%.

What is claimed is:

1. A process for the manufacture of cyclohexanol and cyclohexanone by the oxidation of cyclohexane, wherein an oxygen-containing gas is contacted with cyclohexane in a first vessel until the cyclohexane is saturated with oxygen, then the oxygen-saturated cyclohexane is passed to a second vessel for oxidation of said cyclohexane, said second vessel being maintained at a temperature higher than the temperature in said first vessel, the improvement which comprises maintaining said first vessel at a temperature between about 30° to 120° C. and at a pressure between about 30 to 200 kg./cm.$^2$, and maintaining said second vessl at a temperature in the range of from about 150 to 250° C. and a pressure in the range of from about 30 to 200 kg./cm.$^2$, said temperature in said first vessel being maintained at from about 20 to 100° C. below the temperature in said second vessel, and said pressure in said first vessel being maintained at from 10 to 30 kg./cm.$^2$ below the pressure in said secoud vessel.

2. A process according to claim 1 further comprising employing an oxidation catalyst in said second vessel.

3. A process according to claim 1 further comprising employing cobalt naphthenate in said second vessel as an oxidation catalyst.

4. A process according to claim 1 further comprising employing an oxidation accelerating agent and a drying agent in said second vessel.

5. A process according to claim 1 wherein said first vessel is maintained at a temperature about 80° C. and a pressure about 140 kg./cm.$^2$, said second vessel is maintained at a temperature about 162° C. and a pressure about 150 kg./cm.$^2$, and further comprising employing cobalt naphthenate in said second vessel as an oxidation catalyst.

References Cited
UNITED STATES PATENTS 2,994,717   8/1961   Johnson _____ 260—586B

FOREIGN PATENTS 1,431,459   1/1966   France _____ 260—631

BERNARD HELFIN, Primary Examiner

N. P. MORGENSTERN, Assistant Examiner

U.S. Cl. X.R.

260—631